United States Patent [19]
Holl
[11] 3,794,331
[45] Feb. 26, 1974

[54] CHANGE SPINDLE FOR USE IN AN AUTOMATIC RECORD CHANGER

[75] Inventor: Martinus Johannes Holl, La Lande Patry, France
[73] Assignee: U.S. Philips Corporation, New York, N.Y.

[22] Filed: Oct. 28, 1971
[21] Appl. No.: 193,401

[30] Foreign Application Priority Data
Nov. 2, 1970 France .............................. 7039410

[52] U.S. Cl. .............................................. 274/10 S
[51] Int. Cl. .......................................... G11b 17/04
[58] Field of Search........................................ 274/10 S

[56] References Cited

UNITED STATES PATENTS 2,837,338 6/1958 Andres .............................. 274/10 S
2,512,121 6/1950 Thevenaz........................... 274/10 S
2,726,088 12/1955 Da Costa........................... 274/10 S
3,345,074 10/1967 Estkowski.......................... 274/10 S

*Primary Examiner*—Louis R. Prince
*Assistant Examiner*—Steven L. Stephan
*Attorney, Agent, or Firm*—Frank R. Trifari

[57] ABSTRACT

The invention relates to a change spindle for use in an automatic record changer, and more particularly to a spindle having a hollow cylindrical body and a central operating rod which is axially movable in the cylindrical body and co-operates with elements for supporting the records. The elements are retractable into the cylindrical body and support the records in spaced relation.

9 Claims, 5 Drawing Figures

PATENTED FEB 26 1974 3,794,331

INVENTOR.

MARTINUS JOHANNES HOLL

BY

[signature]

AGENT

CHANGE SPINDLE FOR USE IN AN AUTOMATIC RECORD CHANGER

A change spindle of this type is described in U.S. Pat. Specification No. 1,732,756. In this known change spindle the central operating rod comprises two portions the diameters of which are equal to the inner diameter of the hollow cylindrical body of the spindle and a third reduced-diameter portion separating the equal-diameter portions. The elements for supporting the records comprise sets of balls situated in parallel planes, each set comprising three balls which are spaced from one another by angular distances of 120° and are mounted in apertures formed in the cylindrical body so as to be inclined to the axis of the change spindle. When the reduced-diameter of the portion operating rod is opposite the balls, enough space is provided to permit the balls to be entirely retracted within the hollow cylindrical body. The records are held in spaced relation by the sets of balls. When the operating mechanism of the record changer raises the operating rod through a distance equal to the spacing of the records, the first set of balls will retract within the hollow cylindrical body, so that the lowermost record of the stack of records is released and drops to the turntable of the record changer. When this record has been played, the operating rod is again raised so that the second set of balls retracts and the second plate is allowed to drop, and so on.

This known change spindle has the disadvantage that to enable a sufficient amount of records to be changed the constructional height of the spindle must be comparatively large, which is particularly inconvenient when the record changer is to be accommodated in a shelf unit, bookcase or the like. In addition to the height required for stacking the plates an additional height must be available which is equal to the part of the central operating rod which holds the sets of balls in their operative, i.e., extended, positions for supporting the records.

It is an object of the present invention to overcome these disadvantages and for this purpose the invention is characterized in that the supporting elements are formed by projections provided on both longer sides of two elongate elements. The projections on one longer side of an element being staggered with respect to the projections on the other long side of this element and alternately projecting beyond the cylindrical body and being retracted therein, whilst the elongate elements are arranged symmetrically with respect to their longitudinal axes in engagement with one another. The projections on those longer sides of the elements which face away from one another are situated on equal levels.

The present invention enable the records to be supported in spaced relation by means of a change spindle whose height does not exceed that of the record stack and which comprises a minimum number of component parts.

According to the invention the number of projections on the one longer side of the elongate elements preferably is one less than the number of projections on the other longer side. Each elongate element is provided with a slot which intersects the longitudinal axis of the element and preferably at least one end has a slot portion which extends parallel to this axis. The slots co-operate with pins rigidly secured in the cylindrical body. Each elongate element at one end is provided with means which co-operate with the central operating rod to be disposed in the turntable spindle. The other end of each element includes means which co-operate with a second central operating rod a part of which is accessible from the exterior of the record changer. The said means preferably take the form of slots which co-operate with pins secured to the operating rods. The ends of the operating rods which co-operate with the slot have the form of forks which embrace the juxtaposed elements. At their ends facing the turntable and at the longer sides facing away from one another the elongate elements are each provided with a projecting portion by means of which a record which as dropped to the turntable can be thrust thereto.

An embodiment of the invention will now be described, by way of example, with reference to the accompanying diagrammatic drawings, in which.

Figures 1, 2, 3, 4, 5:
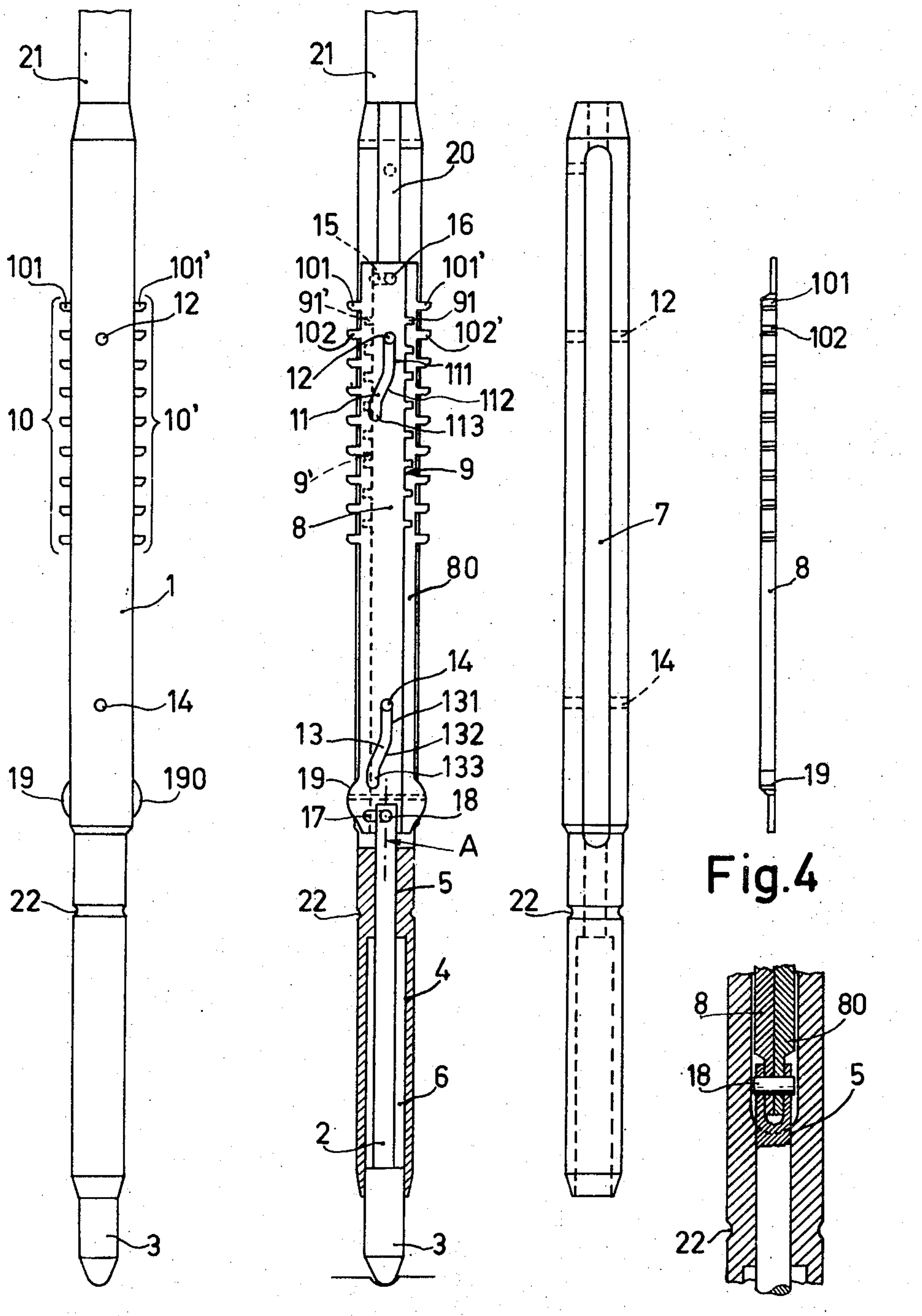
FIG. 1 is an elevation of a change spindle according to the invention.
FIG. 2 is a longitudinal sectional view of the spindle of FIG. 1.
FIG. 3 is an elevation of the hollow cylindrical body of the change spindle according to the invention.
FIG. 4 shows an elongate element according to the invention provided with supporting elements.
FIG. 5 is a longitudinal sectional view of part of the change spindle taken at right angles to the plane of the elongate supporting elements on the line A of FIG. 2.

FIG. 1 is an elevation of the change spindle comprising retractable supporting elements 10, 10' which project from a hollow cylindrical body 1. An operating rod 2 has a free end 3 capable of co-operating with an actuating mechanism of a record changer, not shown. This mechanism, by means of which the axial movement of the operating rod is effected, is known and will not be described more fully herein.

FIG. 2 is a longitudinal sectional view of the change spindle. The hollow cylindrical body 1, which is shown by itself in FIG. 3, has an axial bore, a part 4 of which has a diameter which is greater than the diameter of a part 5. This bore accommodates the operating rod 2 the diameter of which is slightly smaller than the diameter of the part 5. Only the end 3 of the operating rod has a diameter equal to the diameter of the part 4. An annular chamber 6 defined by the inner surface of the body 1 and the outer surface of the operating rod 2 is capable of accommodating a spring (not shown) which determines an inoperative position of the elements for supporting the records. The hollow cylindrical body is provided with a diametrical continuous longitudinal groove 7. An elongate plate-shaped element 8 of small thickness is provided at its two longer sides with two sets of projections which in the embodiment shown take the form of rectangular teeth 9 and 10. The teeth 9 on one side of this element do not lie in the same plane, which is at right angles to the axis of the element, as do the teeth 10, but are situated in a plane parallel to, and equidistant from, planes containing two successive teeth of one set. The width of the element 8 is such that a single set of teeth projects from the cylindrical body 1. Two slots 11 and 13 have been formed in the element 8 at some distance from either end. These slots comprise three portions 111, 112, 113 and 131, 132, 133, respectively. The portion 111 of the slot 11 is parallel to the longitudinal axis of the element 8 and also parallel to the portion 113; the portions 131 and 133 of the slot 13 also are parallel to one another and to the longitudinal axis of the element 8. These portions are interconnected by the portions 112 and 132 respectively the axes of which are inclined to the longitudinal axis of the element 8. The portions 113 and 133 lie on the same axis, as do the portions 111 and 131. The slots 11 and 13 co-operate with pins 12 and 14 respectively provided in the hollow cylindrical body.

At both ends of the elements 8 there are means, which in the embodiment described take the form of transverse slots 15 and 17 into which extend pins 16 and 18 respectively secured in the ends of operating rods 2 and 20 respectively, which ends each are in the form of a fork the limbs of which are disposed one on either side of thee element 8.

FIG. 5 is a sectional view of the lower part of the change spindle taken on the line A of FIG. 2, in particular of the fork-shaped end. The upper part of the change spindle has a similar construction.

Near the lower end of the element 8, which end has no teeth, there is provided on one of the longer sides a projection 19 which in the inoperative position projects from the cylindrical body 1.

FIG. 4 is a side elevation of the elementt 8 the teeth on which serve to support the disc records. The ends provided with the openings 15 and 17 are reduced in diameter to provide space for the fork-shaped ends off the operating rods 2 and 20.

The end 21 of the operating rod 20 (FIG. 2) plays a part corresponding to that of the end 3 of the rod 2. The end 21 enables the change mechanism to be directly operated by hand. The operation of the change spindle according to the invention will be described more fully hereinafter.

It should be noted that the cylindrical body 1 is provided at the end near the operating rod 2 with a circumferential groove 22, which enables the change spindle to be secured in the spindle of the turntable of the record changer by known means.

As FIGS. 2 and 5 show, the change spindle comprises a second element 80 which is equal to the aforedescribed element 8. When these two elements have been mounted in the longitudinal groove 7 the teeth of both elements which project from the change spindle are pairwise situated in the same plane at right angles to the axis.

The slots provided in the element 80 are symmetrical with respect to the slots in the element 8 about the axis of the cylindrical body 1. The portions of the element 80 which correspond to the portions 111 and 131 of the element 8 register with these portions of the element 8, the pins 12 and 14 passing through both elements, whilst the other portions of the slots are symmetrical about the axis. This symmetry also applies to the transverse slots which correspond to the slots 15 and 17 and co-operate with the same pins 16 and 18.

The operation of the change spindle according to the invention is as follows.

Loading the change spindle may be effected in two manners, i.e., either under the influence of the changing mechanism disposed beneath the turntable or manually by operating the end 21 of the rod 20. These two manners of loading are mechanically equal in every respect.

When a record has been placed on the first teeth 101 and 101′ of the elements 8 and 80 respectively an axial force in the vertical direction is exerted on the end 3 of the rod 2 or on the end 21 of the rod 20. At this instant the portions 111 and 131 of the slots 11 and 13 respectively of the element 8 and the corresponding portions of the element 80 slide over the pins 12 and 14, the teeth 10 and 10′ remaining in the projecting positions. Whenn the pins 12 and 14 come into contact with the portions 112 and 132 of the slots 11 and 13 respectively and with the corresponding portions of the element 80, the sets of teeth 10 and 10′ of the elements 8 and 80 respectively gradually disappear into the cylindrical body 1, whilst the sets of teeth 9 and 9′ on the opposite sides gradually appear, symmetrically for the elements 8 and 80. When the regions of transition between the portions 112 and 113 and the portions 132 and 133 reach the pins 12 and 14 respectively, the teeth 10 and 10′ have completely been retracted and replaced by the teeth 9 and 9′ situated on a lower level, so that the record has been released by the first teeth 101 and 101′ and has come to rest upon the intermediate teeth 91 and 91′. The last part of the movement in the portions 113 and 133 of the slots 11 and 13 respectively serves only to permit the record to be lowered on to the new teeth.

When the force exerted on the change spindle is removed, the operating rods and the elements 8 and 80 are returned to their initial conditions by means of the spring arranged in the chamber 6. The slots then move in the reverse direction. The portions 112 and 132 are guided by the pins 12 and 14, the sets of teeth 9 and 9′ gradually retracting into the hollow body 1, whilst the sets of teeth 10 and 10′ gradually emerge. At the transition from the portion 112 to 111 and from 132 to 131 of the slots 11 and 13 respectively of the two elements the sets of teeth 9 and 9′ have completely been retracted, whilst the sets of teeth 10 and 10′ completely project. The record released by the teeth 91 and 91′ drops to the teeth 102 and 102′. The loading operating is repeated a number of times corresponding to the number of records to be stacked on the change spindle. The first record to be played must descend to the teeth nearest the turntable.

The operation of lowering a record to the turntable entirely corresponds to the operation which takes place when the records are stacked on the spindle. The changing mechanism of the record changer operates the end 3 of the rod 2 to raise this rod, and the operation proceeds in the manner described hereinbefore.

It should be noted that the sets of teeth 9 and 9′ perform auxiliary functions only and that the movement of a record from a tooth of the sets 10 and 10′ to the next tooth of the same sets or from a tooth of the sets 10 and 10′ to the turntable comprises two stages, the first stage consisting in lowering the record from a tooth 10 to a tooth 9, whilst the second stage, which ultimately terminates in the inoperative position, consists in moving the record from a tooth 9 to the next tooth 10.

An arrangement for clamping the records to the turntable is constituted by the projection 19 on the element 8 and by the associated projection 190 on the element 80, which projections are operated in synchronism with the retracting movement of the sets of teeth 10 and 10′. During the lowering of the record from the teeth nearest the turntable to the turntable the projections 19 and 190 retract into the hollow body, permitting the record to be dropped to the turntable or on the record just played. This arrangement, which is particularly suitable for use with flexible, for example foil-like, records of small thickness, extends through a comparatively small distance along one of the longer sides of each of the elements 8 and 80. The lower portion of the projection is bevelled so as to enable it to exert a thrust force along the circumference of the centre hole of the record to be played and to hold this record in position.

It should be noted that the number of teeth 10, 10′ which project in the inoperative position of the change spindle exceeds the number of normally retracted teeth 9, 9′ by one, in other words between the last teeth of the sets of teeth 10, 10′ and the turntable there are no intermediate teeth of the sets 9, 9′.

The spacing between two successive teeth of a set, for example the teeth 101 and 102, must at least be equal to twice the thickness of a record increased by the width of a tooth, to prevent blocking of the change spindle.

The change spindle according to the invention comprises a very limited number of component parts, the minimum being only four main components: the hollow cylindrical body 1, the operating rod 2 and the two elongate plate-shaped elements 8 and 80 provided with the supporting elements; moreover the construction of these component parts is so simple that they can readily and cheaply be manufactured. The elongate plate-shaped elements 8 annd 80, for example, may be manufactured in a single operation by punching.

What is claimed is:

1. A change spindle for use in a record changer comprising a hollow cylindrical body, a central operating rod axially movable within said cylindrical body, a pair of elongated elements axially movable within said cylindrical body and being in cooperative engagement with said operating rod, each of said elongated elements having two longer sides and two shorter sides, a plurality of supporting projections carried on both longer sides of each of said elongated elements for supporting thereon records in spaced relation, the projections on one of said longer sides of each elongated element being located in a different transverse plane than projections carried on the other longer side of the same elongated element so that the projections on one side are staggered with respect to the projections on the other side, said elongated elements being arranged symmetrically with each other about their longitudinal axes, the projections on those longer sides of the elongated element which face away from one another being located in the same transverse plane, said projections being arranged so as to project through said cylindrical body and retractable thereinto, and a cam slot in each of said elongated elements cooperative with a pin carried by said cylindrical body for moving said elongated elements so that said projections are alternately projecting from the body and retracted therein.

2. A change spindle for use in a record changer comprising a hollow cylindrical body having openings along its longitudinal surface, a pair of elongated elements axially movable within said cylindrical body, a central operating rod carried within said cylindrical body in cooperative engagement with said elongated elements and axially movable within said body, a plurality of support projections carried on both longer sides of each of said elongated elements and arranged for projection through said openings in said cylindrical body for supporting thereon records in spaced relation, the projections on one of said longer sides of each elongated element being located in a different transverse plane than projections carried on the other longer side of the same elongated element so that the projections on one side are staggered with respect to the projections on the other side, the number of projections on one of the longer sides of each of said elongated elements being one less than the number of projections on the other longer side of the same elongated element, said elongated elements being arranged symmetrically with each other about their longitudinal axes, the projections on the longer sides of the elongated elements which face away from one another being located in the same transverse plane, and a cam slot in each of said elongated elements cooperative with a pin carried by said cylindrical body for moving said elongated elements so that said projections may be moved alternately from projecting through said cylindrical body to being retracted thereinto.

3. A change spindle for use in a record changer comprising a hollow cylindrical body, a central operating rod axially movable within said cylindrical body, a pair of elongated elements axially movable within said cylindrical body and being in cooperative engagement with said operating rod, each of said elongated elements having two longer sides and two shorter sides, a plurality of supporting projections carried on both longer sides of each of said elongated elements for supporting thereon records in spaced relation, the projections on one of said longer sides of each elongated element being located in a different transverse plane than the projections carried on the other longer side of the same elongated element so that the projections on one side are staggered with respect to the projections on the other side, said elongated elements being arranged symmetrically with each other about their longitudinal axes, the projections on the longer side of the elongated elements which face away from one another being located in the same transverse plane, said projections being arranged so as to project through said cylindrical body and retractable thereinto, and means for moving said elongated elements so that said projections are alternately projected from the body and retracted therein including a cam slot in each elongated element which intersects said longitudinal axis of each elongated element, and a pin rigidly secured within said cylindrical body in cooperative engagement with said slots for guiding movement of said elongated elements.

4. The change spindle according to claim 3 wherein said slot at at least one end thereof has a portion extending parallel to the longitudinal axis of said element.

5. The change spindle according to claim 3 further comprising an additional projection carried on each of said elongated elements located at the end thereof nearer the turntable and on the longer sides thereof for clamping a record to the turntable after it has dropped thereonto.

6. The change spindle according to claim 3 wherein said central operating rod is arranged in the turntable shaft and is provided with means for cooperating with each of said elongated elements.

7. The change spindle according to claim 6 further comprising a second central operating rod a portion of which is accessible from the exterior of the record changer and provided with means for cooperating with said elongated elements.

8. The change spindle according to claim 7 wherein said means provided on each of said central operating rods for engagement with said elongated elements comprise slots located in said elongated elements and pins secured to said operating rods engaged in said slots.

9. The change spindle according to claim 8 wherein the end of each of said operating rods cooperating with said slots is bifurcated embracing juxtaposed elongated elements.

* * * * *